Figure 1:
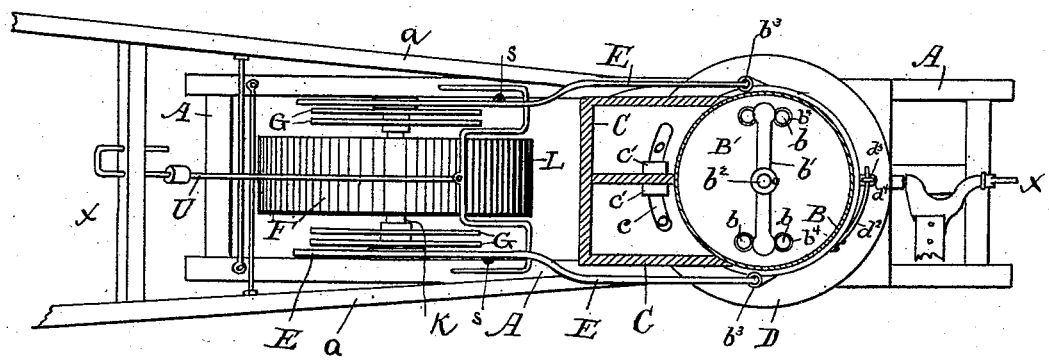

(No Model.) 2 Sheets—Sheet 1.

W. E. WHITMAN.
PLANTER.

No. 495,144. Patented Apr. 11, 1893.

Witnesses:
D. H. Drummond
C. H. Mosley

Inventor:
William E. Whitman
by S. W. Bates
his atty.

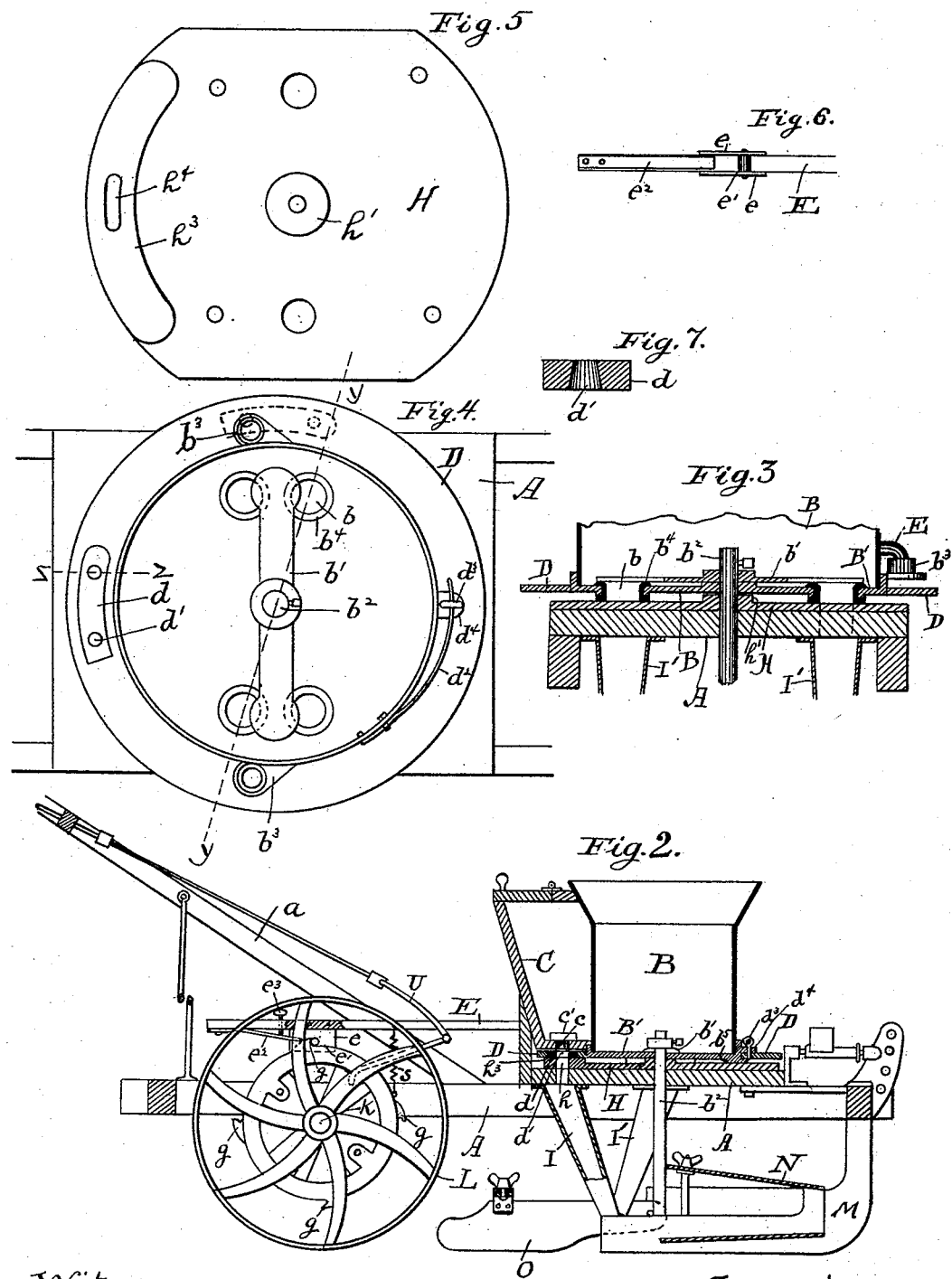

UNITED STATES PATENT OFFICE.

WILLIAM E. WHITMAN, OF AUBURN, MAINE.

PLANTER.

SPECIFICATION forming part of Letters Patent No. 495,144, dated April 11, 1893.

Application filed April 5, 1892. Serial No. 427,960. (No model.)

*To all whom it may concern:*

Be it known that I, WILLIAM E. WHITMAN, a citizen of the United States, residing at Auburn, in the county of Androscoggin and State of Maine, have invented certain new and useful Improvements in Planters; and I do hereby declare the following to be a full, clear, and exact description of the invention, such as will enable others skilled in the art to which it appertains to make and use the same.

My invention relates to improvements in planters and particularly to certain improvements which I have made in the seed planter and fertilizer distributer patented to W. A. Holt, June 18, 1889, No. 405,478. In said planter it was found that practical experience developed certain defects which my invention aims to correct as follows, viz:—In the Holt planter the fertilizer hopper was pivoted on the main frame and was reciprocated on its pivot by the action of cams. The seed box was secured to the frame directly in rear of the fertilizer hopper and the base of said hopper had an apron or projection made integral therewith which extended under the seed box and formed a reciprocating bottom therefor. Set in this apron was a gage containing cells or openings of suitable size and number into which the seed dropped and by which it was discharged to the ground. Gages of varying capacity were provided and it was designed that they should be removed and changed according to the seed to be used. As the machine was constructed there was no way of getting at and removing the gage except through the seed box and it was thus necessary to remove the contents of the box each time a change was made. My improvement as to this feature of the machine consists in constructing the apron or drop plate which forms the bottom of the seed box so that it may be temporarily detached from the hopper and slipped out from beneath the seed box and so that the gage may be removed, the apron extending laterally far enough so that some portion of it will be beneath the seed box when the gage is in a position to be removed. I prefer to make it annular and have it surround the base of the hopper, being secured to it by temporary fastenings, as will be hereinafter pointed out. In the Holt machine the rod by which the fertilizer hopper was reciprocated had a square shoulder which engaged a pointed, tooth-like projection on the edge of the cam, and the time the two parts were held in engagement was regulated by a screw passing through the rod in rear of the shoulder on the rod. It was found that these two surfaces rubbing together caused a good deal of friction and that the screw did not release them accurately and it was the release of the rod which regulated the amount of fertilizer used, as explained in said patent. I have introduced an anti-friction roll which I pivot to the rod between the side plates by which the rod is held on to the cam and this roll receives the thrust of the cam teeth the working edge of the tooth being provided with a recess to receive the roll. The let off is effected by a straight spring attached to the rod in rear of the roll and having a free end directly back of the roll and extending toward the same. Its distance from the rod is regulated by a screw. This roll acts with little friction and in conjunction with the flat surface of the spring it is found that it can be accurately let off at any point, thus securing the use of just the desired quantity of fertilizer. Again, in the planter as it has hitherto been constructed the ports in the bottom of the hopper through which the fertilizer was discharged have had an iron bushing which easily became corroded by the acid in the fertilizer causing a rough opening. This roughness prevented the fertilizer from passing through easily and frequently caused it to clog. The base plate on which the hopper rested was made of cast iron and it was difficult to make a tight joint between the port in the hopper and the perforated plate beneath. If there was an imperfect fit of these parts the fertilizer would work in between the hopper and the plate on which it rested. I remedy these defects by providing the port with a soft metal acid-proof bushing, such as lead, having a projection beneath, which extends down sufficiently far to take the bearing off the central hub. As soon as the hopper is used and caused to reciprocate the bushing rapidly wears down and makes a tight joint with the plate beneath.

I illustrate my invention in the accompanying drawings in which

Figure 1. is a plan view, the seed box and fertilizer being in section. Fig. 2. is a longitudinal section on the line $xx$ of Fig. 1. Fig. 3. is a section on the line $y\ y$ of Fig. 4. Fig. 4. is a plan view of the base of the hopper in position on the main frame. Fig. 5. is the same view of the base plate on which the hopper rests. Fig. 6. is a view of the under side of one of the rods which reciprocate the hopper, and Fig. 7. is a section on $z\ z$ of Fig. 4 showing the seed gage.

I will first describe briefly the parts of the old machine and then show the changes which embody my improvement.

A represents the main frame of the machine.

M is the plow, N the mold board, O the covering plow and L the driving wheel mounted on the main shaft K.

I and I' are the chutes which convey the seed and the fertilizer respectively to the ground.

On the main shaft are the cams G G having teeth $g$ by which the driving rods are actuated.

$a\ a$ represent the handles and U is the lever by which the rods E are raised from the cams G and the reciprocation of the hopper is checked.

On the top of the main frame A rests a base plate H as I shall call it, having a central bar $h'$ and a raised portion $h^3$ in the rear. A slot $h^4$ is formed in the raised portion $h^3$. Resting on this base plate is the fertilizer hopper B which is pivoted by the pin $b^2$ to the main frame and in rear of the hopper is the seed box C having in its bottom an opening or slot $c$ which corresponds with the opening $h^4$ in the base plate beneath.

$c'\ c'$ are brushes which extend down into the opening $c$.

$b^3\ b^3$ are the lugs in the sides of the hopper B which engage with the ends of the driving rods E.

$b\ b$ are the discharge ports in the bottom of the hopper and $b'\ b'$ are the arms which cover the ports $b^4$ while the latter are discharging.

The parts already described are those common to this machine and the Holt machine and need no further description and I will now describe the parts which embody my improvement.

Around the ports $b$ in the bottom of the hopper I place a bushing $b^4$ which I make of some acid proof metal which is at the same time soft, such as lead. This is melted and run into place by means of suitable molds. The bushing has a projection on its lower end which extends far enough down so that it rests on the base plate and takes the weight of the hopper, lifting it slightly from the central bar $h'$ (see Fig. 3). As the hopper rotates the lower end of the bushing $h^4$ quickly wears down bringing the bearing on the bar $h'$ and forming a tight joint between the port and the surface of the base plate which is usually of cast iron.

Surrounding the lower part of the hopper is a flat ring or drop plate D which passes under the stationary seed box and forms a bottom for it. The forward portion of the ring rests on a lug $b^5$ on the under side of the hopper and the rear portion rests on the raised portion $h^3$ of the base plate H.

Immediately under the opening $c$ in the seed box and over the opening $h^4$ in the base plate is a corresponding opening in the drop plate D and in this opening is inserted the gage $d$ having two or more holes or cells $d'$. These cells are larger at the bottom than at the top the more easily to discharge their contents without clogging. This ring or drop plate is adapted to be turned about the hopper so that the gage $d$ may be brought out from beneath the hopper and to a position where it may be removed without removing the contents of the hopper. See dotted lines in Fig. 4. When the ring is turned as described, some portion of it always remains beneath the bottom of the seed box so that the seeds are kept in place in the box. The ring is temporarily secured to the hopper B. For this purpose I use a pin $d^3$ passing through a lug $d^4$ on the hopper, said pin entering an aperture in the ring or drop plate D. A spring $d^2$ holds the pin in position.

On the sides of the rods E where they rest on the cams G and to keep them in position, are two plates $e\ e$. Between these plates I pivot an anti-friction roll $e'$ in a position to engage the recessed teeth of the cam. In rear of the roll is a spring $e^2$ one end of which is secured to the rod while the other end is free to move from and toward the rod in rear of the roll. It is held in place by the screw $e^3$. The position of the spring as determined by the screw regulates the time during which the roll will remain in engagement with the tooth of the cam and will accordingly limit the motion of the hopper and the amount of fertilizer used, as pointed out in the Holt patent. The spring $s$ keeps the rod E down and prevents it from leaving the cam G. The working edge of the cam tooth $g$ is provided with a recess which is adapted to receive the roll. The drop plate D need not extend entirely around the hopper, it is only necessary that it shall be sufficiently large so that when the gage $d$ is drawn out to a position where it can be removed some portion of the plate will be beneath the seed box.

I claim—

1. In a planter, a main frame and a fertilizer hopper pivoted thereto, a seed box held stationary on said main frame adjacent to said hopper, an annular drop plate under said seed box and surrounding the base of said hopper and adapted to be rotated about said base, a removable gage in said drop plate having apertures through which the seed falls, the upper surface of said gage being flush with the upper surface of said plate, a base plate on which said drop plate rests, said base plate having an aperture beneath said gage and means for temporarily securing said annular drop plate to said hopper, substantially as described.

2. In a planter, a main frame and a reciprocating hopper thereon, a stationary seed box adjacent to said hopper, a seed plate beneath said drop box and forming a bottom therefor, said drop plate having a perforated gage for the discharge of seeds and being temporarily secured to said hopper and being adapted to slide from beneath said seed box to bring the said gage into a position to be removed while a portion of said plate remains beneath said seed box, substantially as described.

3. In a planter, a main frame and a fertilizer hopper pivoted thereto, a rod pivoted at each side of said hopper by one end, a cam wheel on the edge of which the rear end of said rod rests, side plates on said rod to retain it in position on said cam wheel, an anti-friction roll pivoted between said plates, projections on said cam wheel adapted to engage on said roll to push it forward, a spring secured by one end to the rod in rear of the said roll and having a free end directly in rear of said roll, a screw for adjusting the said spring away from or toward said bar whereby the time said projection engages said cam may be regulated, substantially as described.

4. In a planter a main frame, a base plate thereon, a fertilizer hopper pivoted on said base plate, openings through said base plate and ports in the bottom of said hopper through which the fertilizer is discharged, said ports having a soft metal bushing which extends below the bottom of the hopper to the base plate to form a support for said hopper, substantially as described.

5. In a planter, a fertilizer hopper having a cast iron base and having ports in said base for the discharge of fertilizer, acid proof bushings in said ports for preserving the smoothness of the same, substantially as described.

In testimony whereof I affix my signature in presence of two witnesses.

WILLIAM E. WHITMAN.

Witnesses:
   THOMAS W. WATSON,
   A. S. WHITMAN.